United States Patent
Omuro et al.

(10) Patent No.: US 7,921,698 B2
(45) Date of Patent: Apr. 12, 2011

(54) METHOD AND SYSTEM FOR DETECTING A CRANK ANGLE OF AN ENGINE

(75) Inventors: Yoshiya Omuro, Saitama (JP); Katsuhiro Ouchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 12/322,470

(22) Filed: Feb. 3, 2009

(65) Prior Publication Data
US 2009/0241649 A1  Oct. 1, 2009

(30) Foreign Application Priority Data
Mar. 26, 2008 (JP) ................................ 2008-081669

(51) Int. Cl.
*G01M 15/02* (2006.01)
(52) U.S. Cl. .................................................. 73/114.26
(58) Field of Classification Search ............... 73/114.26, 73/114.27, 114.28
See application file for complete search history.

(56) References Cited

U.S. PATENT DOCUMENTS

| | | | |
|---|---|---|---|
| 5,979,413 A * | 11/1999 | Ohnuma et al. ............. 123/491 |
| 6,378,358 B1 * | 4/2002 | Hirakata et al. ........... 73/114.27 |
| 6,505,128 B1 * | 1/2003 | Shimizu et al. ............... 702/33 |
| 6,595,044 B2 * | 7/2003 | Namari ...................... 73/114.27 |
| 6,805,096 B2 * | 10/2004 | Iizuka ....................... 123/406.18 |
| 6,889,540 B2 * | 5/2005 | Yonezawa et al. ......... 73/114.26 |
| 7,013,719 B2 * | 3/2006 | Adachi et al. ............. 73/114.27 |
| 7,069,774 B2 * | 7/2006 | Nakamura et al. ......... 73/114.26 |
| 7,783,411 B2 * | 8/2010 | Asada et al. .................. 701/103 |
| 2004/0182142 A1 * | 9/2004 | Nakamura et al. ........... 73/118.1 |

FOREIGN PATENT DOCUMENTS

JP     2007-182797     7/2007

* cited by examiner

*Primary Examiner* — Freddie Kirkland, III
(74) *Attorney, Agent, or Firm* — Carrier Blackman & Associates, P.C.; William D. Blackman; Joseph P. Carrier (57) ABSTRACT

A method and a system for detecting a crank angle of an engine includes detecting a non-toothed portion of a crank pulse rotor during a inlet valve open period for preventing falsely recognizing compression top dead center as a position of the non-toothed portion. A crank angle sensor is arranged at a position facing an outer circumference of a crank pulse rotor including a non-toothed portion thereof. An interval calculating unit measures crank pulse time intervals between adjacent teeth based on a sensing signal received from the crank angle sensor. The measured successive crank pulse time intervals are compared for detection of the non-toothed portion. A ratio calculating unit calculates a ratio of crank pulse intervals. A maximum ratio detecting unit determines presence of the non-toothed portion when the calculated ratio of crank pulse interval is the maximum in the cycle of the engine.

20 Claims, 6 Drawing Sheets

METHOD AND SYSTEM FOR DETECTING A CRANK ANGLE OF AN ENGINE

CROSS-REFERENCE TO RELATED APPLICATIONS

The present invention claims priority under 35 USC 119 based on Japanese patent application No. 2008-081669, filed on Mar. 26, 2008. The entire subject matter of this priority document, including specification claims and drawings, is incorporated by reference herein.

BACKGROUND OF THE INVENTION

1. Field of the Invention

The present invention relates to a method and a system for detecting a crank angle of an engine. More particularly, the present invention relates to a method and a system for detecting a crank angle of an engine, which are capable of avoiding false detection of a non-tooth position of a crank pulse rotor.

2. Description of the Background Art

There is a known method of detecting a crank angle through an output signal from a crank angle sensor arranged at a position facing a crank pulse rotor attached to a crankshaft of an engine. The crank pulse rotor includes a plurality of teeth, or protrusions, formed at predetermined crank angle intervals (for example, 30 degrees) on an outer circumference thereof. The crank pulse rotor also includes a non-toothed portion formed on a portion of the outer circumference thereof.

The crank angle sensor outputs a crank pulse when the crank angle sensor detects presence of each tooth. A crank pulse interval in the non-toothed portion is longer than a crank pulse interval in the toothed portion of the crank pulse rotor. Accordingly, each crank pulse is assigned to a stage number based on the non-toothed portion to determine crankshaft angle, and to perform fuel injection control and ignition timing control of the engine.

There are a number of ways of determining a timing, at which a position of the non-toothed portion of the crank pulse rotor can be set in a cycle of the engine, among various timings in a cycle of the engine. The layout of the non-toothed portion can be determined, for example, by mainly aiming at accurate detection of ignition timing. In this case, the non-toothed portion can be set to correspond to the valve opening start timing of an inlet valve.

In other words, for the purpose of reducing an error at starting energization, the non-toothed portion can be set not to correspond to the energization start timing of a spark plug. However, if the non-toothed portion is set not to correspond to the energization start timing, then the non-toothed portion corresponds on a valve open period of the inlet valve. Accordingly, even if the throttle opening drastically increases during the open period of the inlet valve, such a change cannot be detected, thus causing lean combustion in some cases.

It is desirable to prevent lean combustion at a time of rapid acceleration, and to enhance the drivability of the vehicle by modifying the position of the non-toothed portion in consideration of fuel injection. Specifically, when the non-toothed portion is arranged to correspond to the valve opening start timing of the inlet valve, calculation of additional fuel injection and injection based on the calculation can be performed in response to a change in throttle opening even after starting opening state of the inlet valve, thereby preventing lean combustion.

A controller of a single-cylinder 4-cycle engine is disclosed in Japanese Patent Laid-open Publication No. 2007-182797. The controller includes an apparatus for determining strokes based on the crank pulse intervals in relation to the difference in crank pulse interval throughout the individual strokes of the engine. In the apparatus of Japanese Patent Laid-open Publication No. 2007-182797, the non-toothed portion is set not to correspond to the ignition timing.

However, when the non-toothed portion is laid out so as to come in front of the crank angle sensor at a time of opening the inlet valve, the non-toothed portion does not correspond to a time just after a top dead center (TDC) position.

Accordingly, especially in case of a single-cylinder 4-cycle engine, the crank pulse intervals largely differ between just before and just after the TDC position. This causes disadvantages in detecting the non-toothed portion based on the degree of change in pulse interval before and after the non-toothed portion. Specifically, the position at the TDC could be falsely detected as the non-toothed portion.

The present invention has been made to overcome such drawbacks of the method of detecting a crank angle of an engine. Accordingly, it is one of the objects of the present invention to provide a method and a system for detecting a crank angle of an engine, which are capable of accurately distinguishing a non-toothed portion of a crank pulse rotor, and the TDC position thereof even with a layout in which the non-toothed portion corresponds to a valve open period of an inlet valve of an engine.

SUMMARY OF THE INVENTION

In order to achieve the above objects, the present invention according to a first aspect thereof provides a method of detecting a crank angle of an engine. The method includes the steps of coupling a crank pulse rotor to a crankshaft of the engine, the crank pulse rotor including a non-toothed portion formed by removing one or more of plurality of teeth consecutively formed at predetermined intervals on an outer circumference of the crank pulse rotor; measuring time intervals between adjacent ones of the teeth during rotation of the crankshaft; and comparing the successive time intervals to detect the non-toothed portion.

In addition, in the method of detecting a crank angle of an engine, the teeth consecutively formed on the crank pulse rotor are arranged in a range including a position corresponding to a top dead center; and a last value of the time interval is divided by a second last value of the time intervals so as to calculate a ratio of the crank pulse intervals. The non-toothed portion is determined to be a position when the ratio of the crank pulse intervals calculated is the maximum within a cycle of the engine.

The present invention according to a second aspect thereof provides a system for detecting a crank angle of an engine. The system includes a crank pulse rotor coupled with a crankshaft of the engine. The crank pulse rotor includes a non-toothed portion formed by removing a one or more of a plurality of teeth consecutively formed on an outer circumference of the crank pulse rotor at predetermined intervals. A crank angle sensor is arranged at a position facing the outer circumference of the crank pulse rotor. The system includes an interval calculating unit for measuring time intervals between adjacent ones of the teeth based on signals of the presence of teeth sensed by the crank angle sensor during rotation of the crankshaft.

In addition, in the system for detecting a crank angle of an engine, the non-toothed portion is detected by comparing the successive time intervals. The consecutive teeth formed on the crank pulse rotor are arranged in a range including a position corresponding to a top dead center.

The system for detecting a crank angle of an engine further includes a ratio calculating unit, which performs division of a last value of the time intervals by a second value of the time intervals so as to calculate a ratio of crank pulse intervals; and a maximum ratio detecting unit which determines the non-toothed portion being a position where the ratio of the crank pulse intervals calculated is the maximum in a cycle of the engine.

EFFECTS OF THE INVENTION

Generally, in a 4-cycle single-cylinder engine, the engine rotary speed significantly fluctuates around a compression top dead center. Specifically, the engine rotary speed is reduced before the compression top dead center and is increased just after the compression top dead center.

Assume a case where the crank pulse rotor includes consecutive teeth formed therearound at a position corresponding to a top dead center and the time intervals between adjacent pairs of teeth are compared. In a method of calculating a ratio, for the above assumed case, by dividing a second last measured time interval by a last measured time interval, and determining a position where the detected ratio is maximum as a non-toothed portion, the ratio detected for compression top dead center is sometimes greater than that for the non-toothed portion. Thus, compression top dead center could be falsely recognized as the non-toothed portion.

According to the first and the second aspects of the present invention, when comparing the time intervals of adjacent teeth, the ratio is calculated by dividing the last measured time interval by the second last measured time interval, and the position at which the maximum ratio is detected is determined to be the non-toothed portion. Therefore, it is possible to prevent that a ratio greater than the non-toothed portion is detected for compression top dead center. It is also possible to prevent false recognition of compression top dead center as the non-toothed portion.

When multiple consecutive teeth of the crank pulse rotor are arranged in a range including a position corresponding to the top dead center, the multiple consecutive teeth of the crank pulse rotor are also positioned in a range including a position corresponding to the bottom dead center.

Accordingly, the multiple consecutive teeth can be detected up to the middle of the intake stroke. Therefore, it is possible to perform calculation of additional injection of fuel and fuel injection amount based on the calculation in response to quick opening of a throttle valve which could occur after the inlet valve is opened. It is also possible to accurately detect the non-toothed portion while securing high drivability of the vehicle.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Hereinafter, an illustrative embodiment of the present invention with reference to the drawings is described.

Figure 2:
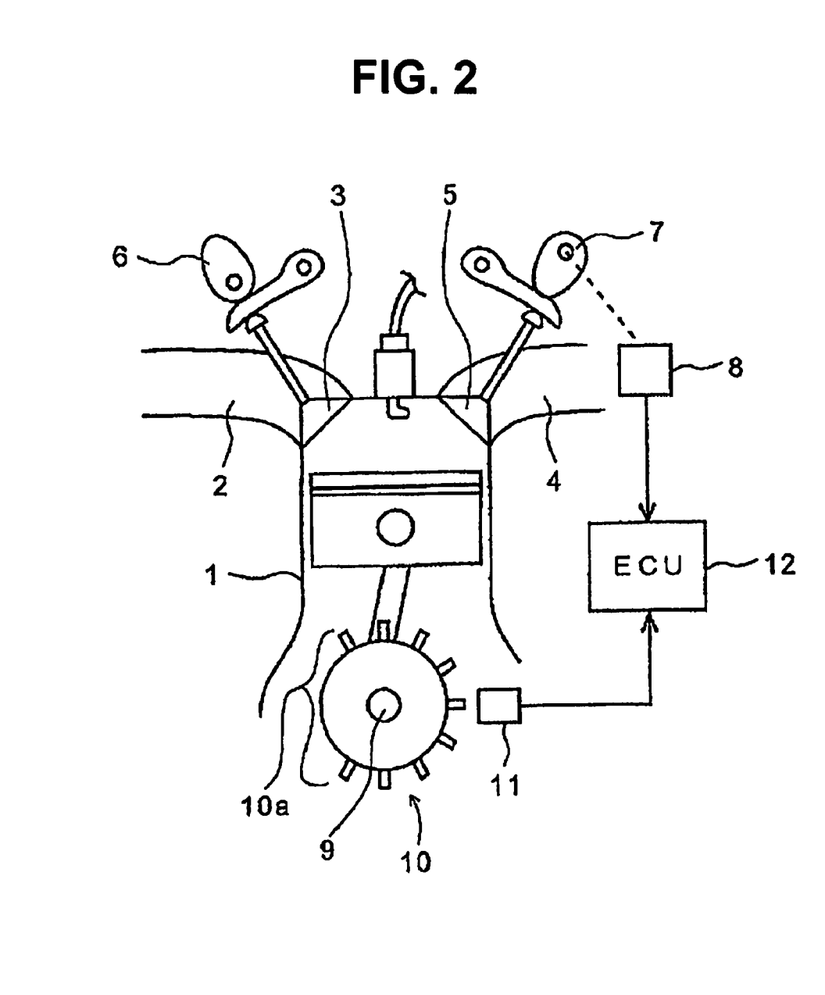
FIG. 2 is a system configuration view of a main portion of a motorcycle to which a method and the system for detecting crank angle according to the illustrative embodiment of the present invention are applied.

FIG. 2 is a system configuration view of a main portion of an engine for a motorcycle to which a method and a system for detecting a crank angle according to an illustrative embodiment of the present invention is applied.

An engine 1, shown in FIG. 2, is a 4-cycle single-cylinder engine. At an inlet port 2 of the engine 1, an inlet valve 3 is provided, and at an exhaust port 4 thereof, an exhaust valve 5 is provided. The inlet and exhaust valves 3 and 5 are always energized by a spring (not shown) so as to be closed and opened by inlet and exhaust cams 6 and 7 for predetermined periods of time. A cam angle sensor 8 is arranged on a shaft of the inlet cam 6. A valve open period of the inlet valve 3 is detected by the cam angle sensor 8.

A crankshaft 9 of the engine 1 is coupled to a crank pulse rotor 10. The crank pulse rotor 10 includes a plurality of teeth formed at predetermined intervals (30 degrees, herein) on the outer circumference of the crank pulse rotor 10. In order to set a reference position of the crank pulse rotor 10, that is, a reference position for detecting crank angle, a non-toothed portion 10a with a tooth interval larger than the above predetermined intervals is formed at a predetermined position. For example, in the non-toothed portion 10a, three teeth are removed to set the tooth interval to 120 degrees. A crank angle sensor 11 is arranged at a position facing the outer circumference of the crank pulse rotor 10.

An electronic control unit (ECU) 12 for ignition timing control and fuel injection control of the engine 1 is provided. The ignition timing control and fuel injection control of the engine 1 are performed based on the crank angle, the cam angle, and the like, and detection signals of the cam angle sensor 8 and crank angle sensor 11 (cam and crank pulses) are inputted to the ECU 12.

In this embodiment, the non-toothed portion is configured to be detected during the valve open period of the inlet valve 3 so that calculation of an amount of additionally injected fuel and the fuel injection based on this calculation can be performed in response to a quick opening of a throttle valve performed after the inlet valve 3 starts to open.

Figure 3:
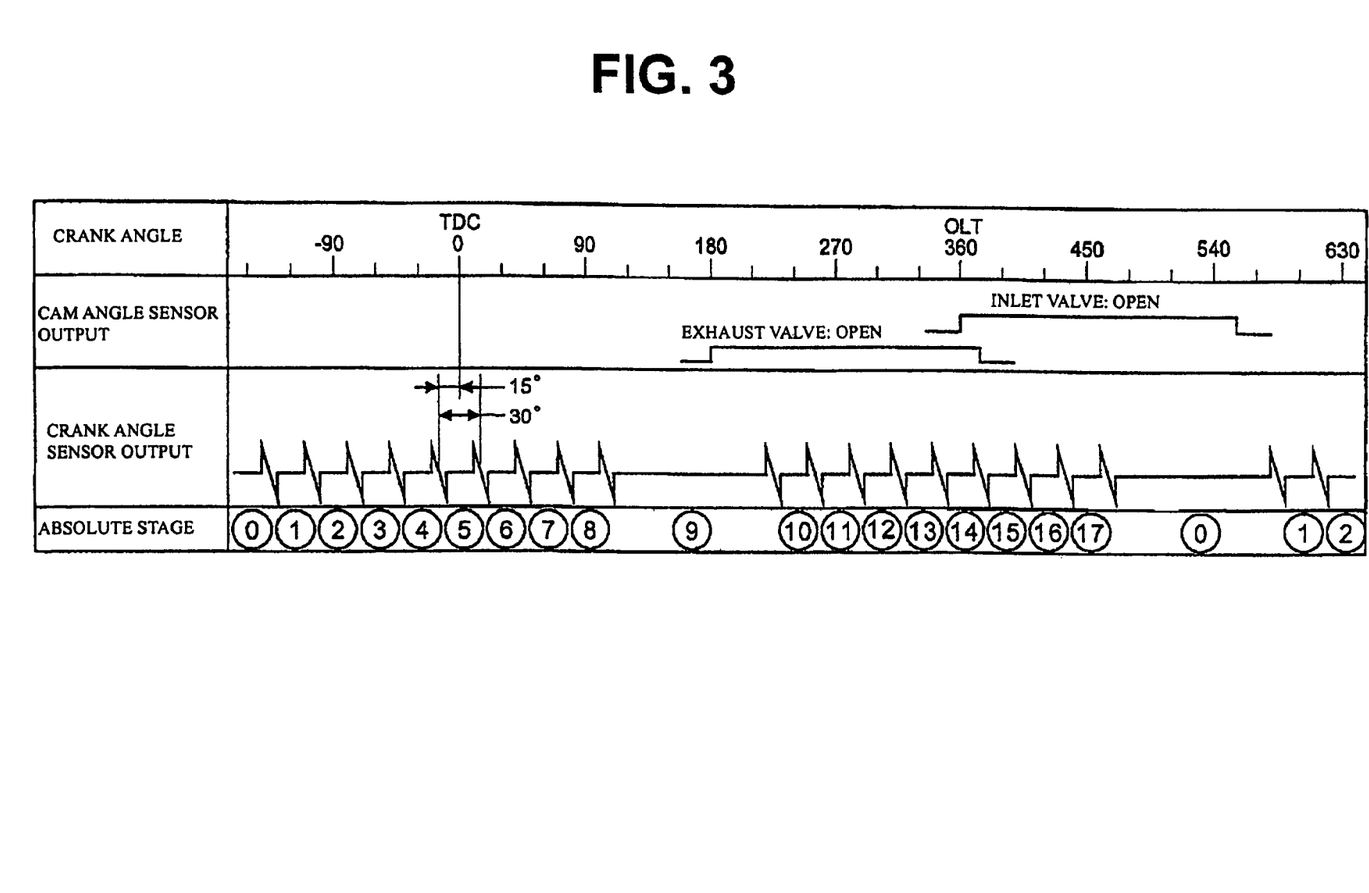
FIG. 3 is a diagram showing crank pulses and valve open timing of an inlet valve of an engine.

FIG. 3 is a diagram showing the crank pulses and valve open timing of the inlet valve 3, not including fluctuations in speed of the engine 1. The diagram of FIG. 3 is an example in which one cycle of the engine 1, or two revolutions of the crankshaft 9, is separated into 18 stages. Each stage corresponds to the crank angle of 30 degrees outside of the non-toothed portion 10a. In a section corresponding to the non-toothed portion 10a, one stage corresponds to the crank angle of 120 degrees. The non-toothed portion 10a corresponds to the stages "0" and "9" in a cycle. The non-toothed portion 10a does not correspond to a top dead center (TDC), and is configured to be detected in the middle of the valve open period of the inlet valve.

In such a layout of the non-toothed portion 10a, in order to detect the position of the non-toothed portion 10a based on the crank pulses, ratios of successive crank pulse (time) intervals are calculated in order to obtain a maximum ratio.

Figure 4:
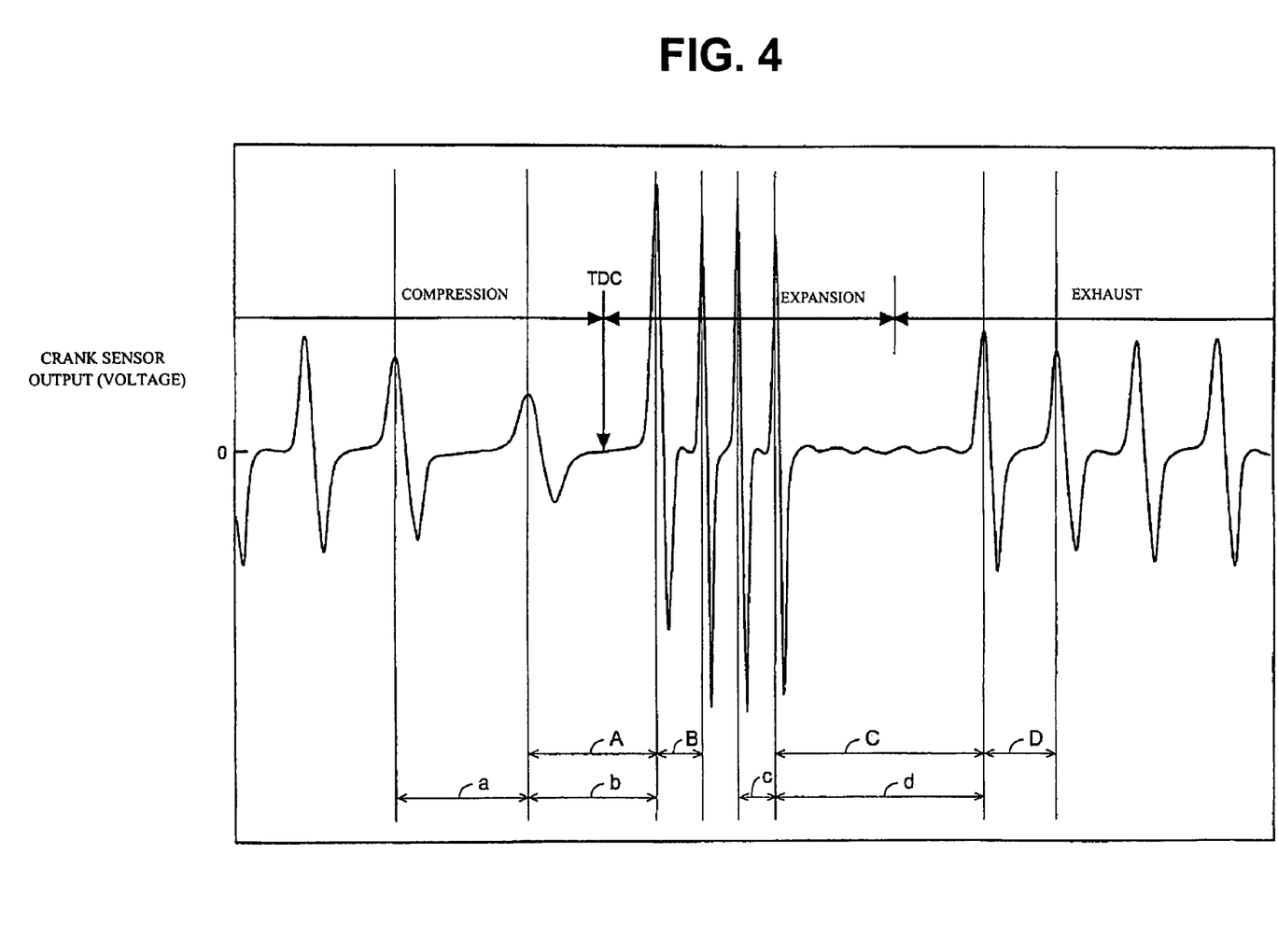
FIG. 4 is an enlarged view of a main portion including crank angle sensor output shown in FIG. 3

FIG. 4 is an enlarged diagram of a main portion of FIG. 3, including rotary speed fluctuations of the engine 1. As shown in FIG. 4, just before the TDC, that is, in a later half of a compression stroke, the engine rotary speed is reduced by a compression load, and therefore, the crank pulse intervals become longer. When the engine goes into an expansion stroke beyond the TDC, the engine rotary speed is increased, and therefore, the crank pulse intervals become shorter.

According to a conventional method of detecting crank angle of an engine, a ratio of crank pulse intervals is calculated by dividing a second last crank pulse interval by a last crank pulse interval, and the position having the most significant result of the division (ratio) within a revolution of the crankshaft 9 is recognized as a start position of the non-toothed portion 10a.

In other words, such ratios A/B, C/D, and the like are shown in FIG. 4. The ratio A/B provides a ratio of crank pulse intervals at the TDC and just after the same, and a ratio C/D provides a ratio of crank pulse intervals at the non-toothed portion 10a and just after the same.

However, it may be noted that a rotary speed of the engine 1 is relatively low during the compression stroke, and is relatively high during the expansion stroke. Accordingly, by the aforementioned calculation method, the ratios A/B and C/D are about the same in some cases, making it difficult to distinguish the TDC position and the non-toothed portion 10a.

Figure 5:
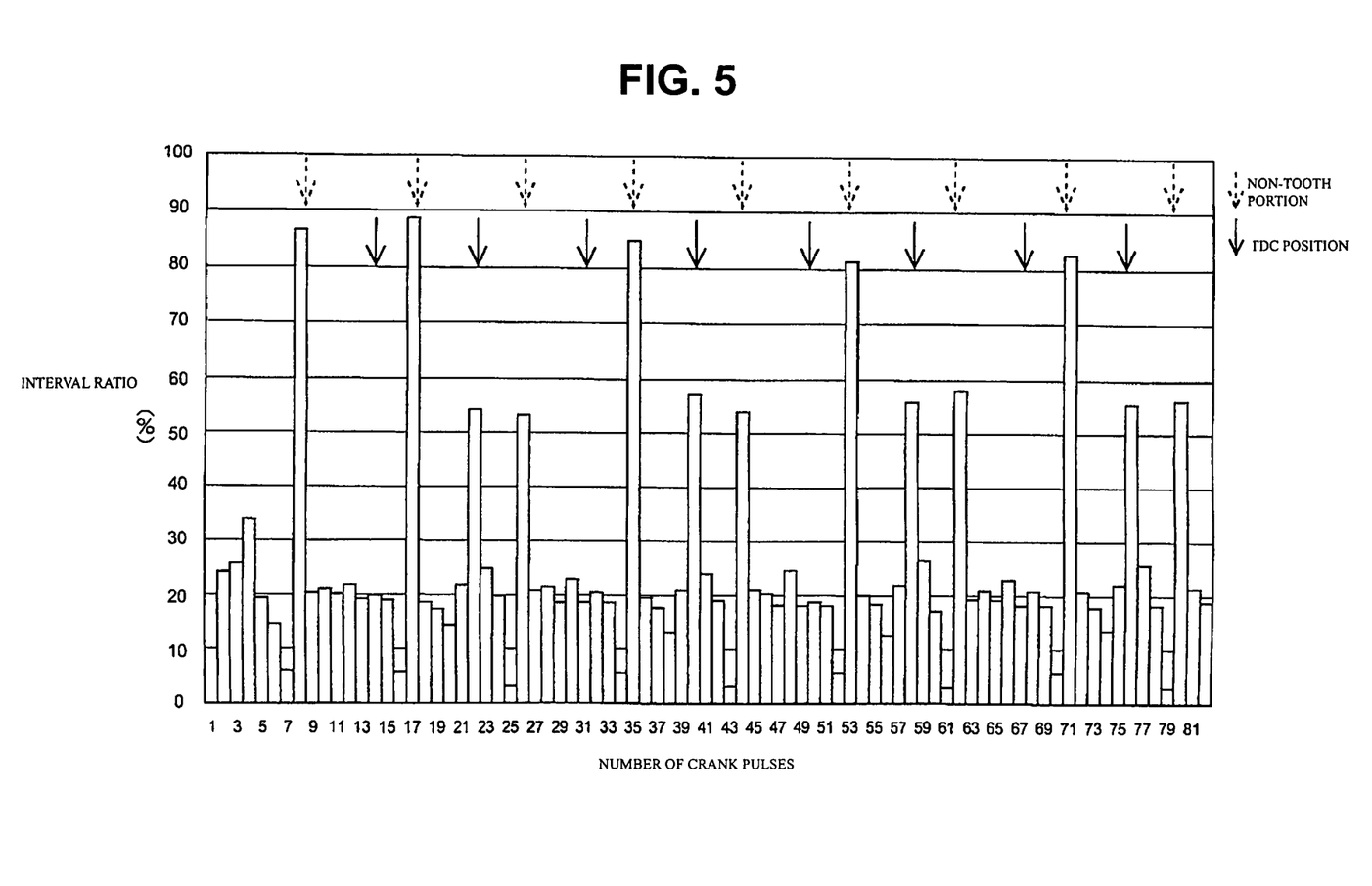
FIG. 5 is a diagram showing results obtained by dividing a second last crank pulse interval by a last crank pulse interval.

FIG. 5 is a diagram showing results obtained by dividing a second last crank pulse interval by a last crank pulse interval. The diagram of FIG. 5 shows the non-toothed portions and the TDC positions in association with the calculation results.

As shown in FIG. 5, the calculation results, that is, the ratios at calculation numbers "22" and "40" corresponding to the TDC are greater than those of the calculation numbers "26" and "44" corresponding to the non-toothed portion 10a.

In other words, in a crank angle range of 360 degrees, a difference in engine rotary speed between at the TDC and just after the same is greater than a difference in engine rotary speed between at the non-toothed portion 10a and just after the same. Accordingly, the TDC position is falsely detected as the non-toothed portion 10a.

According to the present invention, the calculation method was examined so as to reliably detect the maximum ratio at the non-toothed portion in the crank angle range of 360 degrees. As a result, the maximum ratio is configured to be calculated by dividing a last crank pulse interval by a second last crank pulse interval.

Specifically, as illustrated in FIG. 4, ratios b/a, d/c, and the like are calculated according to the present invention. The ratio b/a provides the ratio of crank pulse intervals at the TDC and just before the same, and the ratio d/c provides the ratio of crank pulse intervals at the non-toothed portion 10a and just before the same.

Figure 6:
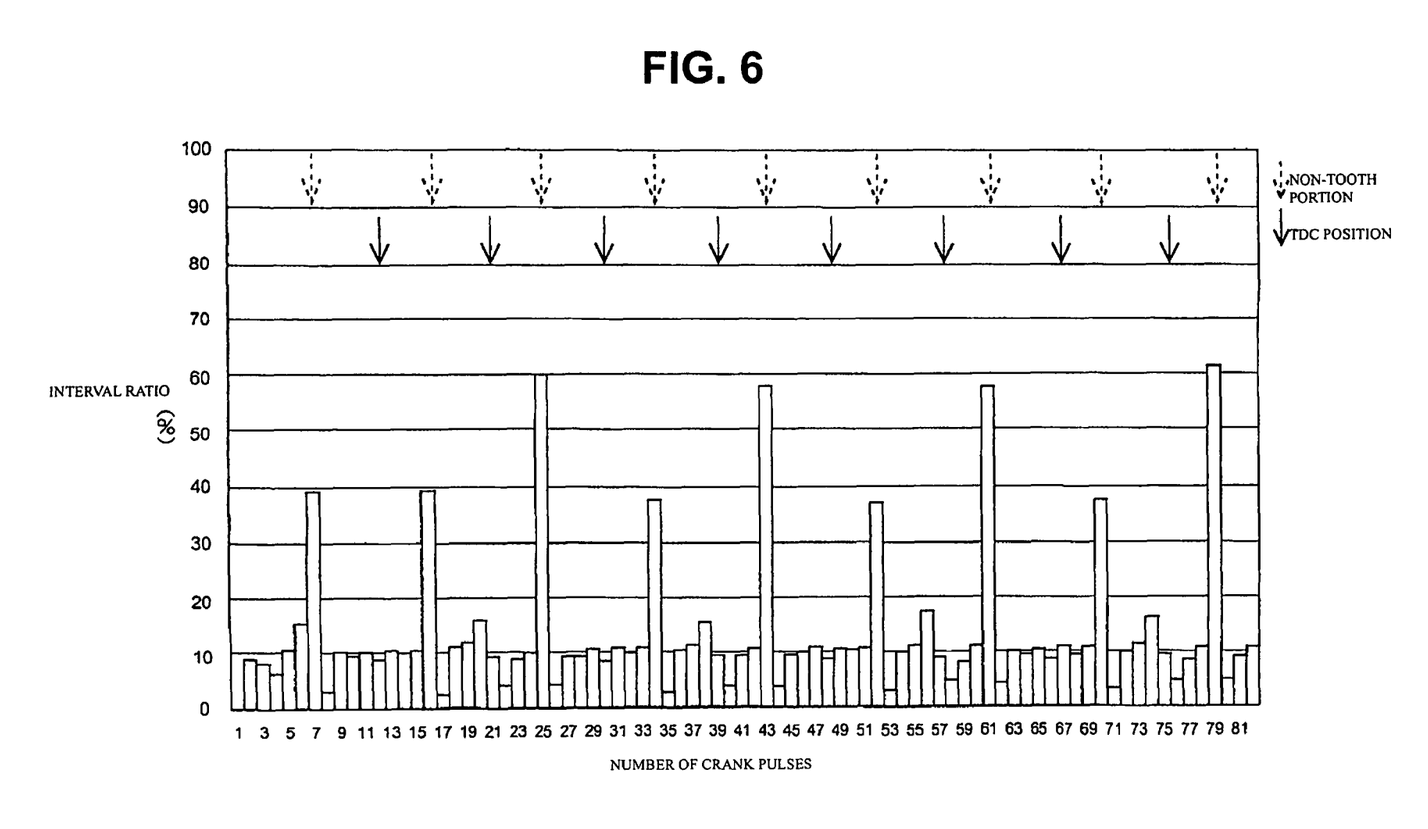
FIG. 6 is a diagram showing results obtained by dividing a last crank pulse interval by a second last crank pulse interval according to the present invention.

FIG. 6 is a diagram showing results obtained by dividing a last crank pulse interval by a second last crank pulse interval, based on a method of calculating the maximum ratios of crank pulse intervals according to the present invention. As shown in FIG. 6, there is no ratio which is greater than that at the non-tooth position in the crank angle range of 360 degrees. Therefore, calculation maximum ratios of crank pulse intervals, according to the present invention ensures appropriate detection of the non-toothed portion 10a.

Figure 1:
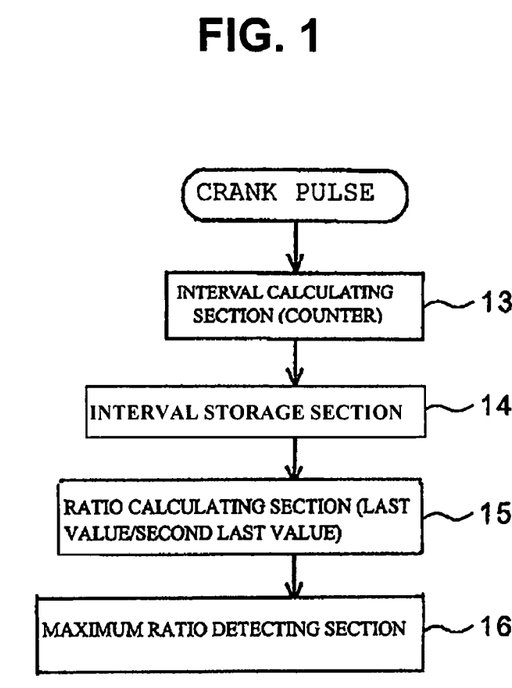
FIG. 1 is a block diagram showing a non-toothed portion detecting functions of a system for detecting a crank angle according to an illustrative embodiment of the present invention.

FIG. 1 is a block diagram showing a non-toothed portion detecting method as a main feature of the ECU 12. An interval calculating section (interval calculation unit) 13 includes a counter for counting clock pulses of a microcomputer (CPU) included in the ECU 12. Each time the interval calculating section 13 receives clock pulses, the counter of the interval calculating section 13 counts clock pulses. The reciprocal of the number of counted clock pulses is stored in an interval storage section 14 as a clock pulse (time) interval.

The interval storage unit 14 is configured to store two values at maximum and delete an older value after two or more values are stored. A ratio calculating section (ratio calculation unit) 15 calculates a ratio of the two values stored in the interval storage section 14. The value stored first among the two values is a second last value, and the value stored later is a last value. The interval ratio is calculated according to the following equation.

Interval Ratio=Last Value/Second Last Value (1)

The calculated interval ratio is inputted into a maximum ratio detecting section (maximum ratio detecting unit) 16. The maximum ratio detecting section 16 stores the maximum of the inputted interval ratios within the crank angle range of 360 degrees, together with the number of crank pulses.

In other words, the value of the interval ratio inputted first is stored without a change, and the value of the interval ratio inputted later is compared to the first inputted value. The larger value is retained while the smaller value is deleted. Accordingly, the maximum ratio detecting section 16 detects the maximum ratio and the crank angle at which the maximum ratio is obtained after the crank pulse corresponding to a crank angle of 360 degrees is completed.

Figure 7:
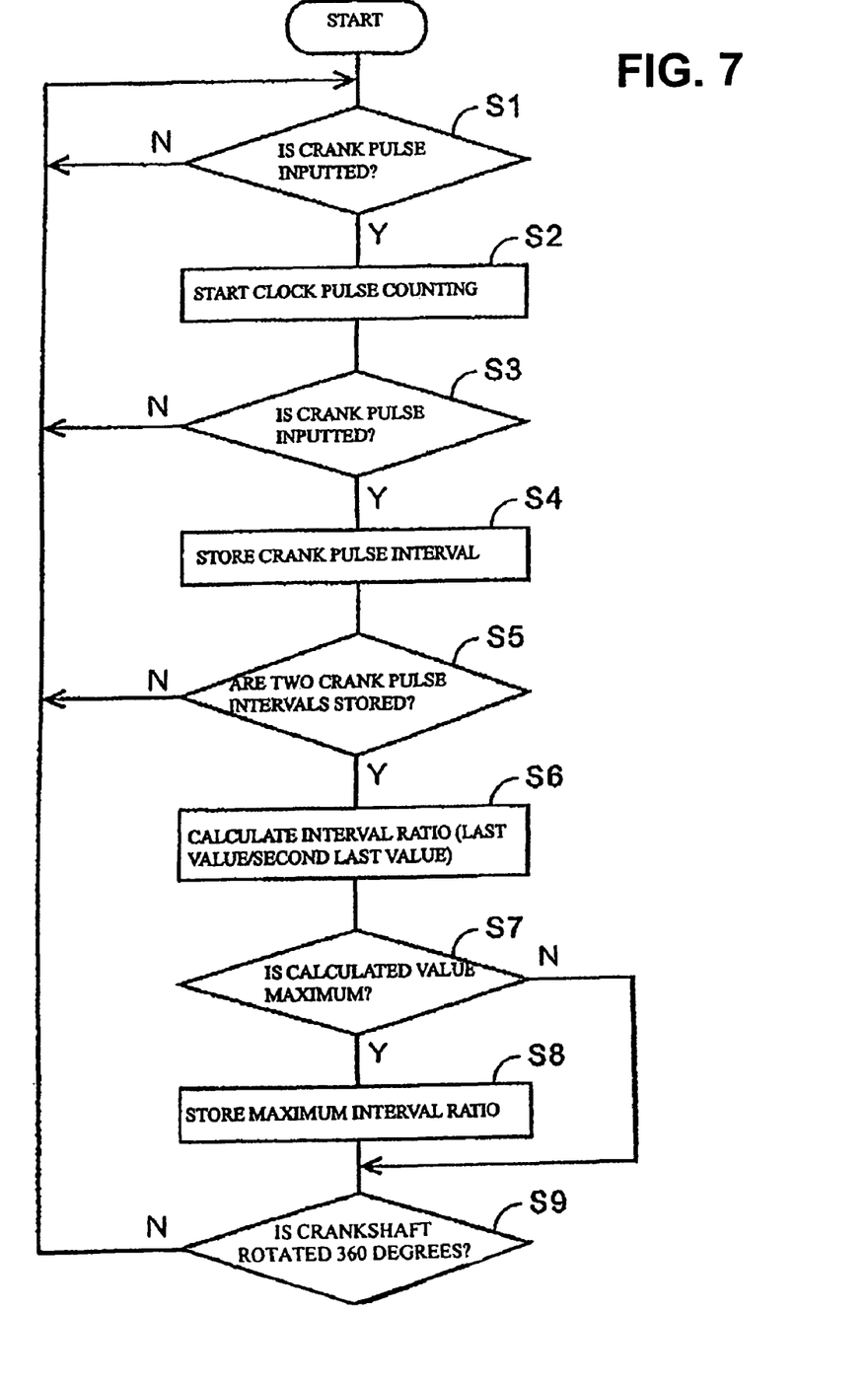
FIG. 7 is a flowchart showing an example of non-tooth position detecting processing of the crank angle detecting system according to the illustrative embodiment of the present invention.

FIG. 7 is a flowchart showing an example of non-toothed portion detecting processing. In step S1 of FIG. 7, it is determined whether a crank pulse is inputted. When a crank pulse is inputted, the process proceeds to step S2, and clock pulse counting by the counter 13 is started. In step S3, it is determined whether a crank pulse is inputted. When the crank pulse is inputted in step 3, the process proceeds to step S4, and a reciprocal of the counter value of the clock pulses at that time is stored in the interval storage section 14 as a crank pulse interval.

In step S5, it is determined whether the interval storage 14 has stored two crank pulse intervals. When two crank pulse intervals are stored, the process proceeds to step 6, and the interval ratio is calculated using the above Equation 1 with the crank pulse interval stored first among the two intervals being the second last value, and the crank pulse interval stored later being the last value. When the interval storage unit 14 stores two crank pulse intervals, the process proceeds to the step S1.

In step S7, it is determined whether the interval ratio calculated in the step S6 is the maximum. When the determination in step S7 is positive, the process proceeds to step S8, and the last calculated interval ratio is stored in the maximum ratio detecting section 16. When the determination in the step S7 is negative, the last calculated interval ratio is not stored. In step S9, it is determine whether the crankshaft 9 is already rotated 360 degrees.

The determination as shown in FIG. 7 is made based on the number of crank pulses. When it is determined that the crankshaft 9 is already rotated 360 degrees, the start position of the non-toothed portion can be determined to be the middle crank pulse of the three crank pulses used for the calculation of the maximum interval ratios stored in the step S8, and therefore, the process is terminated.

As described above, according to the illustrative embodiment, even with the layout is formed in the light of fuel injection in a such a manner that the non-toothed portion 10a is detected during the valve open period of the inlet valve in the light of fuel injection, it is possible to prevent the TDC position from being falsely recognized as the non-toothed portion because of fluctuations of engine rotation due to the TDC.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A method of detecting a crank angle of an engine, said method comprising the steps of:
    (a) coupling a crank pulse rotor to a crankshaft of the engine, said crank pulse rotor comprising a non-toothed portion formed by removing at least one of a plurality teeth consecutively formed at predetermined intervals on an outer circumference of the crank pulse rotor; wherein the teeth consecutively formed on the crank pulse rotor are arranged in a range including a position corresponding to a top dead center position of a piston of the engine;
    (b) measuring successive time intervals between adjacent teeth of the pulse rotor during rotation of the crankshaft, wherein said successive time intervals include a last time interval and a second-to last time interval which is immediately preceding said last time interval;
    (c) calculating crank pulse interval ratios by dividing said currently measured time interval by said immediately preceding time interval;
    (d) comparing a current crank pulse ratio with an immediately preceding crank pulse ratio;
    (e) retaining a larger ratio value selected from said current pulse ratio and said immediately preceding crank pulse ratio;
    (f) repeating the method steps (b) through (e) for a cycle of the engine; and
    (g) determining presence of the non-toothed portion when the ratio of the crank pulse intervals calculated is the maximum ratio within said cycle of the engine.

2. A method of detecting a crank angle of an engine according to claim 1, wherein said step of measuring said successive time intervals between adjacent teeth during rotation of the crankshaft comprises sensing a time associated with adjacent teeth of said crank pulse rotor using a crank pulse sensor.

3. A method of detecting a crank angle of an engine according to claim 2, wherein said crank angle sensor is arranged at a position facing the outer circumference of the crank pulse rotor.

4. A method of detecting a crank angle of an engine according to claim 2, wherein the non-toothed portion is detected by the crank pulse sensor during a valve open period of an inlet valve of the engine.

5. A method of detecting a crank angle of an engine according to claim 1, wherein said plurality of teeth are consecutively formed on a portion covering 240 degrees of the outer circumference of the crank pulse rotor; and wherein said non-toothed portion is formed on a remaining portion covering 120 degrees of the outer circumference of the crank pulse rotor.

6. A method of detecting a crank angle of an engine according to claim 1, wherein said non-toothed portion is formed by removing three of said plurality of teeth consecutively formed at the predetermined intervals on the outer circumference of the crank pulse rotor.

7. A method of detecting a crank angle of an engine according to claim 1, wherein said engine is a 4-cycle, single-cylinder engine.

8. A system for detecting a crank angle of an engine, comprising
    a crank pulse rotor coupled with a crankshaft of the engine, said crank pulse rotor comprising a non-toothed portion formed by removing at least one of a plurality of teeth formed consecutively at predetermined intervals on an outer circumference of the crank pulse rotor; the teeth consecutively formed on the crank pulse rotor arranged in a range including a position corresponding to top dead center position of a piston of the engine;
    a crank angle sensor arranged at a position facing the outer circumference of the crank pulse rotor;
    an interval calculating unit for measuring time intervals between adjacent ones of the teeth based on sensing signals of the teeth detected by the crank angle sensor during rotation of the crankshaft;
    a ratio calculating unit operable to divide a last value of the time interval by a second-to last value of the time interval to calculate a ratio of crank pulse intervals; and
    a maximum ratio detecting unit for comparing a current crank pulse ratio with an immediately preceding ratio and retaining a larger ratio value selected from said current crank pulse ratio and said immediately preceding current crank pulse ratio; and for determining presence of the non-toothed portion when the ratio of the crank pulse intervals calculated is the maximum ratio within a cycle of the engine.

9. A system for detecting a crank angle of an engine according to claim 8, wherein said interval calculating unit is operable to receive a time associated with presence adjacent teeth of said crank pulse rotor by the crank pulse sensor.

10. A system for detecting a crank angle of an engine according to claim 8, wherein the non-toothed portion is detected by the crank pulse sensor during a valve open period of an inlet valve of the engine.

11. A system for detecting a crank angle of an engine according to claim 8, wherein said teeth are consecutively formed on a portion covering 240 degrees of the outer circumference of the crank pulse rotor; and wherein said non-toothed portion is formed on a remaining portion covering 120 degrees of the outer circumference of the crank pulse rotor.

12. A system for detecting a crank angle of an engine according to claim 8, wherein said non-toothed portion is formed by removing three of said plurality of teeth consecutively formed at the predetermined intervals on the outer circumference of the crank pulse rotor.

13. A system for detecting a crank angle of an engine according to claim 8, wherein said engine is a 4-cycle, single-cylinder engine.

14. A method of detecting a presence of a non-toothed portion of a crank pulse rotor coupled with a crankshaft of a 4-cycle, single-cylinder engine, said crank pulse rotor comprising a toothed portion having a plurality of teeth consecutively formed at predetermined intervals on an outer circumference thereof; said teeth being arranged in a range including a position corresponding to a top dead center position of a piston of the engine; said method comprising the steps of:
- (a) measuring crank pulse time intervals between adjacent teeth of said crank pulse rotor during rotation of the crankshaft;
- (b) storing two successive crank pulse time intervals;
- (c) calculating crank pulse time interval ratios by dividing a last value of the crank pulse time interval by a second-to last value of the crank pulse time interval;
- (d) comparing a current crank pulse ratio with an immediately preceding crank pulse ratio;
- (e) retaining a larger ratio value selected from said current pulse ratio and said immediately preceding crank pulse ratio;
- (f) repeating the method steps (b) through (e) for a cycle of the engine; and
- (g) determining a presence of the non-toothed portion when the ratio of the crank pulse intervals calculated is the maximum ratio within said cycle of the engine.

15. A method of detecting a presence of a non-toothed portion of a crank pulse rotor according to claim 14, wherein said step of said measuring crank pulse time intervals between adjacent ones of the teeth during rotation of the crankshaft comprises sensing time associated with adjacent teeth of said crank pulse rotor using a crank pulse sensor.

16. A method of detecting a presence of a non-toothed portion of a crank pulse rotor according to claim 15, wherein said crank angle sensor is arranged at a position facing the outer circumference of the crank pulse rotor.

17. A method of detecting a presence of a non-toothed portion of a crank pulse rotor according to claim 15, wherein the non-toothed portion is detected by the crank pulse sensor during a valve open period of an inlet valve of the engine.

18. A method of detecting a presence of a non-toothed portion of a crank pulse rotor according to claim 14, wherein said plurality of teeth are consecutively formed on a portion covering 240 degrees of the outer circumference of the crank pulse rotor; and wherein said non-toothed portion is formed on a remaining portion covering 120 degrees of the outer circumference of the crank pulse rotor.

19. A method of detecting a presence of a non-toothed portion of a crank pulse rotor according to claim 14, wherein said non-toothed portion is formed by removing three of said teeth consecutively formed at the predetermined intervals on the outer circumference of the crank pulse rotor.

20. A method of detecting a presence of a non-toothed portion of a crank pulse rotor according to claim 14, wherein said crankshaft is rotated by 360 degrees for detecting presence of the non-toothed portion of the crank pulse rotor.

* * * * *